(12) United States Patent
Ben-Yochanan et al.

(10) Patent No.: US 8,341,720 B2
(45) Date of Patent: Dec. 25, 2012

(54) INFORMATION PROTECTION APPLIED BY AN INTERMEDIARY DEVICE

(75) Inventors: Noam Ben-Yochanan, Petach Tikva (IL); John Neystadt, Kfar-Saba (IL); Nir Nice, Kfar Veradim (IL); Max Uritsky, Haifa (IL); Rushmi Malaviarachchi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 868 days.

(21) Appl. No.: 12/350,974

(22) Filed: Jan. 9, 2009

(65) Prior Publication Data

US 2010/0180332 A1    Jul. 15, 2010

(51) Int. Cl.
*G06F 21/00* (2006.01)

(52) U.S. Cl. .......................... 726/12; 713/153

(58) Field of Classification Search ............. 726/12
See application file for complete search history.

(56) References Cited

U.S. PATENT DOCUMENTS

| | | | |
|---|---|---|---|
| 7,051,201 B2 | 5/2006 | Cuomo et al. | |
| 7,103,772 B2 | 9/2006 | Jorgensen et al. | |
| 7,174,021 B2 | 2/2007 | Krishnaswamy et al. | |
| 2003/0055994 A1* | 3/2003 | Herrmann et al. | 709/229 |
| 2004/0221172 A1* | 11/2004 | Stamos et al. | 713/200 |
| 2005/0137969 A1 | 6/2005 | Shah | |
| 2005/0154885 A1 | 7/2005 | Viscomi et al. | |
| 2005/0156708 A1 | 7/2005 | Puranik et al. | |
| 2005/0216745 A1 | 9/2005 | Speare et al. | |
| 2005/0244007 A1 | 11/2005 | Little et al. | |
| 2006/0090202 A1 | 4/2006 | Liu et al. | |
| 2006/0212934 A1 | 9/2006 | Cameron et al. | |
| 2007/0143851 A1* | 6/2007 | Nicodemus et al. | 726/25 |
| 2010/0011432 A1* | 1/2010 | Edery et al. | 726/11 |

OTHER PUBLICATIONS

Kong et al., "ProtectIT: Trusted Distributed Services Operating on Sensitive Data", Apr. 1-4, 2008, EuroSys, pp. 137-147.*

Xu, et al., "Trap Avoidance and Protection Schemes in Networks with Shared Risk Link Groups", retrieved at <<http://www.research.att.com/~dahaixu/pub/srlg/srlg.pdf>>, Journal of Lightwave Technology, vol. 21, No. 11, Nov. 2003, pp. 2683-2693.

Taylor, et al., "Implementing Role based Access Control for Federated Information Systems on the Web", retrieved at <<http://www.crpit.com/confpapers/CRPITV21ATaylor.pdf>>, pp. 9, 2003.

Kawakita, et al., "InfoCage—Information Leakage Protection Software", retrieved at <<http://www.nec.co.jp/techrep/en/r_and_d/a05-no1/a040.pdf>>, Journal of Advanced Technology, vol. 2, No. 1, Winter 2005, pp. 7.

(Continued)

*Primary Examiner* — Matthew Smithers
(74) *Attorney, Agent, or Firm* — Toler Law Group, PC (57) ABSTRACT

Methods, systems, and computer-readable media are disclosed for applying information protection. A particular method includes receiving a data file at a gateway coupled to a network. The data file is to be sent to a destination device that is external to the network. The method also includes selectively applying information protection to the data file at the gateway prior to sending the data file to the destination device. The information protection is selectively applied based on information associated with the destination device, information associated with the data file, and information associated with a user of the destination device.

20 Claims, 4 Drawing Sheets

OTHER PUBLICATIONS

Smallwood, Robert, "Enterprise Rights Management Heats Up", retrieved at <<http://www.kmworld.com/Articles/Editorial/Feature/Enterprise-rights-management-heats-up-14320.aspx>>, KMWorld, Sep. 1, 2005.

Morin, Tim, Press Release, "Liquid Machines Announces New Enterprise Rights Management Solution to Persistently Protect Data Accessed Outside of Microsoft SharePoint", retrieved at <<http://www.liquidmachines.com/content2485>>, Liquid Machines, Sep. 29, 2008.

* cited by examiner

INFORMATION PROTECTION APPLIED BY AN INTERMEDIARY DEVICE

BACKGROUND

Internal networks can facilitate transfer of information within an organization. For example, corporate networks can be used to support electronic messaging (e.g., email or instant messaging), file sharing and storage systems. Internal networks may also be coupled to external networks, for example, using an intermediary device, such as a gateway, that facilitates transfer of data between the internal network and the external network. One benefit of exposing an internal network to an external network is that users may connect to the internal network via the external network, using a device outside the internal network to access data within the internal network. This allows users to work with data or files stored at the internal network while away from locations associated with the internal network. However, such user access via an external network can present a security risk.

For example, a user at a client computing device connected to an external network may access the intermediary device from the client computing device. The intermediary device may authenticate the user (e.g., by requiring a user identification, a password, a security token, etc.), and, after the user is authenticated, the user may be able to download sensitive information from devices on the internal network (e.g. file servers, document management servers, File Transfer Protocol servers, web servers, revision control systems and mail servers). The downloaded information may remain on the client computing device on the external network and can result in disclosure of the information to unauthorized parties that later use the client computing device.

In another example, a user connected to the internal network may connect to a computing device connected to the external network through an intermediary device. The user may be able to upload sensitive information from devices of the internal network to the computing device connected to the external network, resulting in potential information disclosure to unauthorized parties.

SUMMARY

A gateway or other intermediary device is used to couple an internal network (e.g., a corporate network) to an external network. The gateway is adapted to receive data via the internal network that is to be sent to a destination device that is external to the internal network. The gateway includes an information protection component. The information protection component applies information protection to the data at the gateway prior to sending the data to the destination device based on a security policy. The security policy may include policies based on user identity, device health of the destination device, data classification, location of the destination device, other information about the destination device, other parameters, or any combination thereof. For example, the information protection component may evaluate information associated with the destination device, information associated with the data, and information associated with a user that caused the data file to be sent to the destination device, and may selectively apply information protection to the data based on such information. The information protection applied to the data may include persistent protection that protects the data after the data is sent to the destination device. Thus, information in the data is protected even if the data remains on the destination device when a party that is not authorized to access the data has access to the destination device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A method of selectively applying information protection is disclosed. The method includes receiving a data file at a gateway or other intermediary device coupled to a network. The data file is to be sent to a destination device that is external to the network. The method also includes selectively applying information protection to the data file at the gateway prior to sending the data file to the destination device. The information protection is selectively applied based on information associated with the destination device, information associated with the data file, and information associated with a user of the destination device.

In another particular embodiment, a computer-readable medium is disclosed that includes instructions that, when executed by a computer, cause the computer to selectively apply information protection to a data file received at a gateway coupled to a network. The data file is to be sent to a destination device that is external to the network. The information protection is selectively applied to the data file based on information associated with the destination device, information associated with the data file, and information associated with a user of the destination device. The computer-readable medium also includes instructions that, when executed by the computer, cause the computer to send the data file to the destination device.

In another particular embodiment, a gateway is disclosed that includes a network interface to receive a data file via a network. The data file is to be sent to a destination device that is external to the network. The gateway also includes a rights management component to selectively apply rights management to the data file at the gateway prior to sending the data file to the destination device. The rights management is selectively applied by the rights management component to the data file based on information associated with the destination device, information associated with the data file, and information associated with a user of the destination device.

Figure 1:
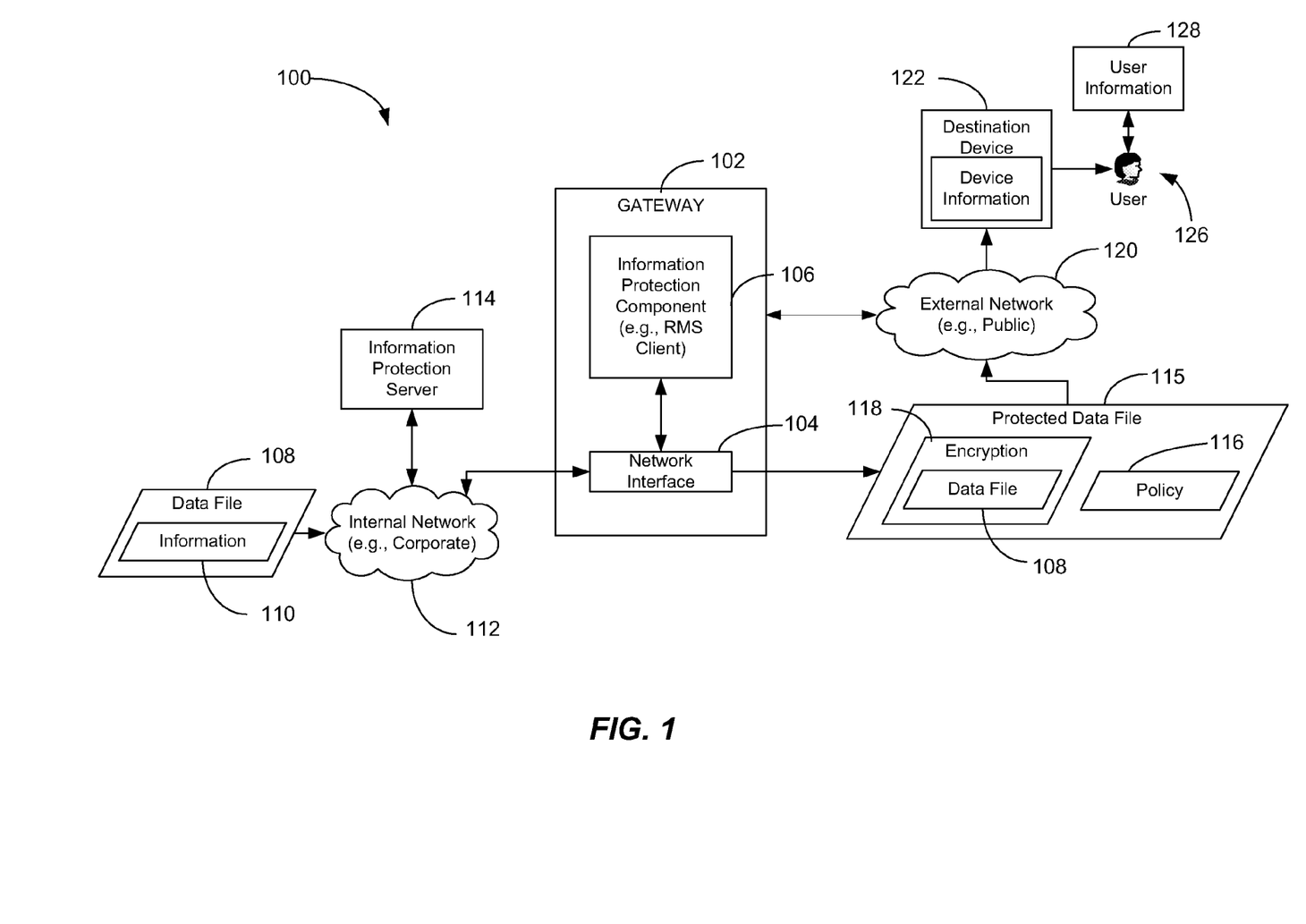
FIG. 1 depicts a particular embodiment of a system to apply information protection using an inline intermediary device.

FIG. 1 depicts a particular embodiment of a system to apply information protection. The system is designated generally 100. The system 100 includes an intermediary device, such as a gateway 102, coupled to an internal network 112 and to an external network 120. For example, the internal network 112 may include a private network, such as a corporate network or another network associated with a particular entity. The external network 120 may be a public network 120, such as the Internet.

In a particular embodiment, the gateway 102 includes a network interface 104 to receive data, such as a data file 108, via the internal network 112. The data file 108 is to be sent to a destination device 122 that is external to the internal network 112. The destination device 122 may be coupled to the external network 120. In a particular embodiment, the destination device 122 includes a publicly accessible computing device. Examples of publicly accessible computing devices include computing devices at libraries, shared computing devices at computing labs, computing devices at businesses that provide access to computing devices (e.g., "cyber cafes" or internet cafes), computing devices coupled to unsecure public networks (e.g., municipal wireless networks), other computing devices that are not secured against public access, or any combination thereof.

In a particular embodiment, the gateway 102 includes an information protection component 106. The information protection component 106 is adapted to apply information protection to the data file 108 at the gateway 102 prior to sending the data file 108 to the destination device 122 based on a security policy. The information protection may be applied to the data file 108 based on device information 124 associated with the destination device 122. In another example, the information protection may be applied to the data file 108 based on information 110 associated with the data file. In another example, the information protection may be applied to the data file 108 based on user information 128 associated with a user 126 of the destination device 122. In a particular embodiment, the information protection may be applied to the data file 108 based on a combination of the information 110 associated with the data file 108, the user information 128, and the device information 124. The information protection may include access protection (e.g., encryption), policy-based user rights, or any combination thereof.

In an illustrative embodiment, the information protection is selectively applied to the data file 108 based on a confidentiality level of the data file 108. For example, the confidentiality level may include a zero protection level, a low protection level, and a high protection level. In another example, the confidentiality level may be related to the business impact of the information, such as a low business impact, a medium business impact, or a high business impact. In another example, the confidentiality level may indicate particular types of usage restrictions, such as do not forward, read-only, encrypt for communication or storage, do not print, and so forth. The confidentiality level may be determined based on the information 110 associated with the data file 108. For example, the confidentiality level may be explicitly indicated in the data file 108 or in metadata associated with the data file 108. Alternately or in addition, the confidentiality level may be determined based on an analysis of the data file 108 or of metadata associated with the data file 108. To illustrate, the confidentiality level may be determined based on a keyword search of the data file 108, by comparing the data file 108 to a pattern of data, by determining a storage location of the data file 108, or any combination thereof.

The information protection may be selectively applied to the data file 108 at the gateway 102 using the information protection component 106. The information protection component 106 may have access to an information protection server 114 via the internal network 112. The information protection server 114 may be involved in making protection decisions or authorization decisions for access to the data file 108. In a particular embodiment, the information protection component 106 is a record management system (RMS) client and the information protection server 114 is an RMS server.

An information protection policy 116 may also be selectively applied to the data file 108 to generate a protected data file 115. The information protection policy 116 may specify rights that the user 126 will have with respect to the data file 108 at the destination device 122. For example, the information protection policy may be an information rights management (IRM) policy. The information protection policy 116 may indicate a read only policy, a do not forward policy, a do not save policy, a do not reply to all policy, a do not print policy or other policies as specified by the information protection component 106. The information protection policy 116 and the encryption 118 may together protect the protected data file 115 at the destination device 122. In a particular embodiment, the protected data file 115 can be decrypted using a private cryptographic key, such as a public key infrastructure (PKI) based private key associated with the user 126 of the destination device 122.

After applying the encryption 118 and the policy 116 to the data file 108, the gateway 102 sends the protected data file 115 to the destination device 122. In a particular embodiment, the destination device 122 includes an application to access the protected data file 115 and to enforce the policy 116. The application may limit actions that can be taken by the user 126 with respect to the protected data file 115 based on the policy 116. Additionally, the application may automatically remove the protected data file 115 from the destination device 122 based on the policy 116.

In a particular embodiment, the gateway 102 may determine based on the user information 128, the device information 124, the information 110 associated with the data file 108, or any combination thereof, not to send the data file 108 to the destination device 122. For example, when the user 126 does not have sufficient access rights to access the data file 108 remotely (e.g., outside the internal network 112), when the data file 108 is prohibited from being accessed remotely, or when the destination device 122 does not have a required security state, the data file 108 may not be sent to the destination device 122 by the gateway 102.

FIG. 1 illustrates a "pull" use case, where the user 126 of the destination device 122 attempts to pull the data file 108 from the internal network 112. However, the system 100 is also functional in a "push" use case, where the user 126 is a user of a device coupled to the internal network 112 and is attempting to send or push data to the destination device 122. For example, when the user 126 attempts to send the data file 108 to the destination device 122, the gateway 102 may gather the user information 128 associated with the user sending the data file 108, the device information 124 associated with the destination device 122 and the information 110 associated with the data file 108 and selectively apply information protection based on the user information 128, the device information 124 and the information 110 associated with the data file 108.

Figure 2:
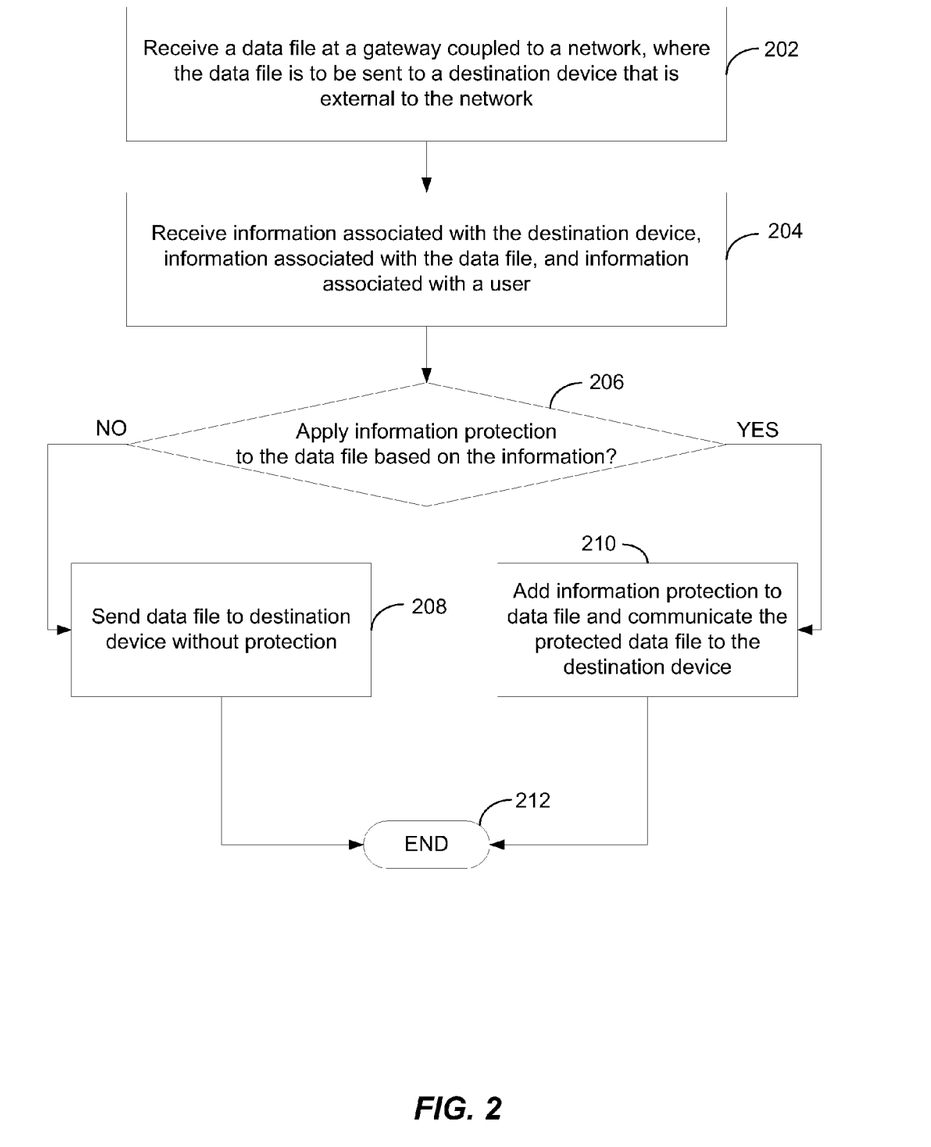
FIG. 2 is a flow diagram depicting a first particular illustrative embodiment of a method of applying information protection using an inline intermediary device.

FIG. 2 is a flow diagram depicting a first particular illustrative embodiment of a method of applying information protection. The method includes, at 202, receiving a data, such as a data file, at an intermediary device, such as a gateway, coupled to a network. The data is to be sent to a destination device that is external to the network. For example, the data may include a document, an executable application, a web page, an email, a spreadsheet, a database record, or any combination thereof.

The method also includes, at 204, receiving information associated with the destination device, information associated with the data, and information associated with the user of the destination device. The information associated with the destination device may include compliance information. For example, the information associated with the destination device may include a trusted machine indicator, a compliant machine indicator, or both. The compliant machine indicator represents compliance with corporate security policies, such as presence of an anti-virus program, an anti-malware program, a patch level, a system configuration, a firewall, use of other programs or hardware, other security policies, or any combination thereof. The trusted machine indicator may be determined based on information about the destination device, such as a machine certificate (e.g., an authentication certificate verifying the identity of the destination device), a file key, a registry key, a running process, a domain membership (e.g., a network address associated with the destination device), or any combination thereof. The trusted machine indicator may indicate whether the destination device is identified as a trusted device (e.g., a device associated with the network, such as corporate laptop computer).

The information associated with the data may include a confidentiality level. The confidentiality level may be explicitly indicated in the data or by metadata associated with the data. For example, the confidentiality level may be indicated in a data field of a data file or by metadata associated with the data file.

Alternately or in addition, the confidentiality level may be determined based on an analysis of the data or metadata associated with the data. For example, the data may undergo contextual analysis to determine its classification which may correspond to a confidentiality level. To illustrate, the data may be scanned to determine whether it includes one or more keywords from a list of keywords. The keywords may include words that explicitly indicate a confidentiality level of the data file, such as "internal use only", "confidential", or "secret". In another example, a pattern of the data may be analyzed to determine the confidentiality level. To illustrate, the data may be compared to templates associated with certain types of confidential documents. The templates may include document formats associated with various types of controlled documents. In yet another example, a storage location of the data may be examined to determine the confidentiality level. To illustrate, confidential data may be stored at a designated folder, database, or other storage location. In a further example, the metadata associated with the data may be examined to determine the confidentiality level. To illustrate, the metadata may indicate a computing device or user that generated the data, and data generated by particular computing devices or users may be assigned a particular confidentiality level. The confidentiality level may indicate various levels of protection, such as a zero protection level (e.g., no protection required), a low protection level, and a high protection level. The confidentiality level may also indicate particular types of protection, such as do not forward, read-only, encrypt for communication or storage, do not print, and so forth, as discussed above.

The information associated with the user of the destination device may include information provided directly by the user, information determined by the gateway based on an identification provided by the user, or both. For example, the information associated with the user may include a user identification provided by the user. The user identification may be used to access other information associated with the user. Another example of information associated with the user includes information provided by the user during the request. The user may indicate during the request whether the user desires the data to be protected or not. Another example of information associated with the user includes user status information. The user status information may include an employee status level of the user, an employee security level, or both. For example, based on the user identification, the gateway may determine the employee status level of the user. The employee status level may indicate, for example, whether the user is a full-time employee, a part-time employee, a contract employee, or another person with access to the internal network (e.g., a supplier or customer). In another example, the gateway may determine the employee security level of the user based on the identification. The employee security level may include information access privileges associated with the user, such as a level or type of confidential information the user can access, whether the user can access such confidential information outside the internal network, and so forth.

The gateway may selectively apply information protection to the data prior to sending the data to the destination device. For example, the information protection may be selectively applied based on the information associated with the destination device, the information associated with the data, the information associated with a user of the destination device, or any combination thereof. In a particular embodiment, the method includes, at 206, determining whether to apply information protection to the data based on the received information. When the determination, at 206, is to not apply information protection, the method includes, at 208, sending the data to the destination device without protection. When the determination, at 206, is to apply information protection to the data, the method includes, at 210, adding protection to the data and communicating the protected data to the destination device. In a particular embodiment, the protection added to the data includes persistent information protection. The protected data file may include a persistent set of access controls that travels with the data. The method ends at 212.

Figure 3:
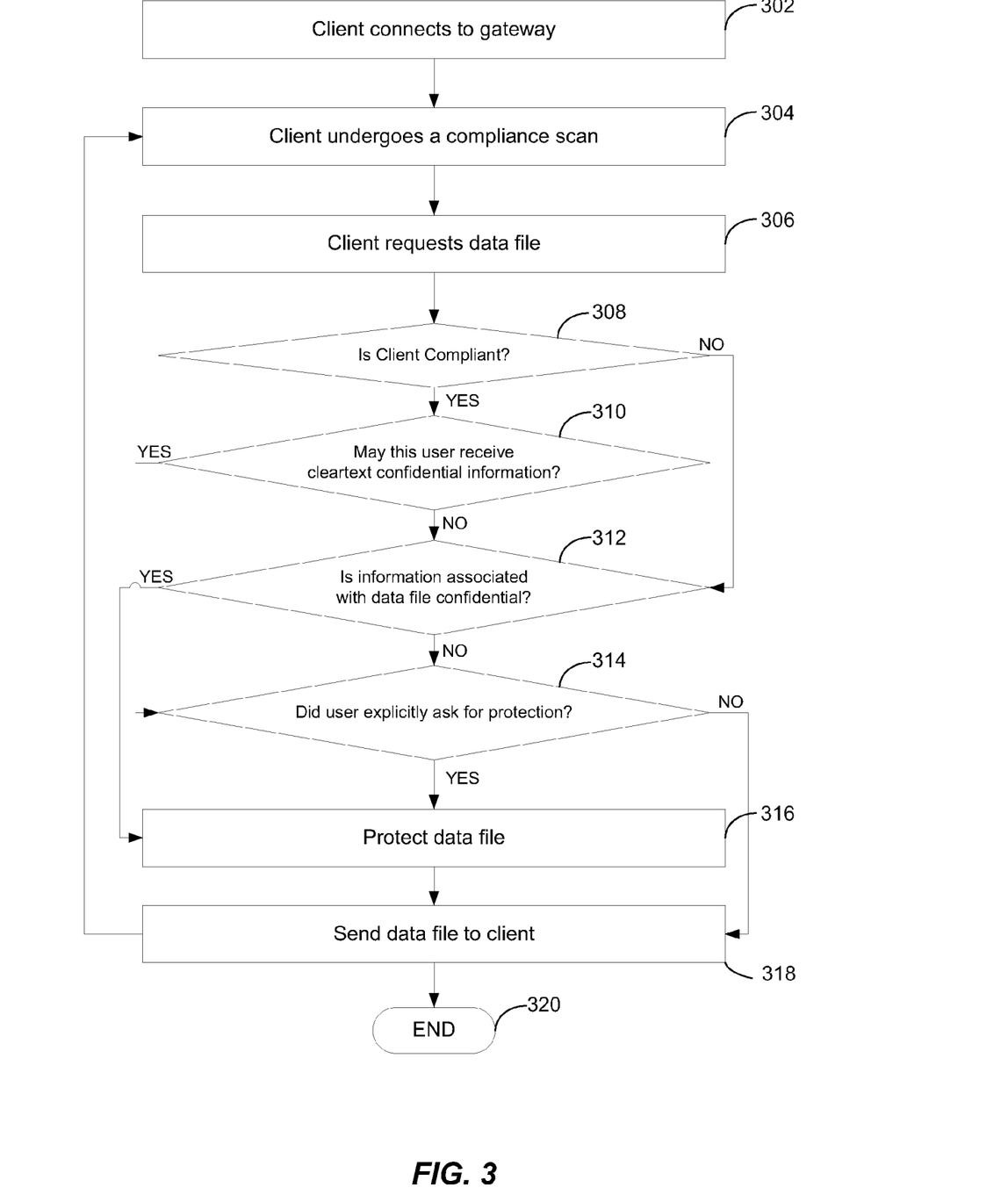
FIG. 3 is a flow diagram depicting a second particular illustrative embodiment of a method of applying information protection using an inline intermediary device.

FIG. 3 is a flow diagram depicting a second particular illustrative embodiment of a method of applying information protection. The method includes, at 302, a client connecting to a gateway. The gateway connects a private network (e.g. a corporate network) to a public network (e.g., the internet). The client may connect to the gateway via the public network to access data stored at a device coupled to the private network. At 304, the client undergoes a compliance scan. The client requests data, such as a data file, at 306.

The method also includes, at 308, determining whether the client is compliant. For example, the gateway may monitor a compliance level of the destination device with respect to at least one security policy associated with the private network. To illustrate, the compliance level may be determined based on whether the client has a data leakage prevention (DLP) component. A DLP component at the client may enforce information protection and policies applied by the gateway. The compliance level may also be determined based on whether the client is a computing asset associated with the private network. For example, when the client is a portable computing device that belongs to or is administered by a company that controls the private network, the client may have a more favorable compliance level than when the client is a public computing device at a library. Whether the client is a computing asset associated with the private network may be determined by examining a user or machine certificate of the client, a file or registry key of the client, one or more running processes of the client, a domain membership of the client, or any combination thereof. The compliance level may also be determined based on a system configuration of the client. For example, the compliance level may depend on whether the client has or is running certain types of software applications.

To illustrate, the compliance level may depend on whether the client has or is running anti-virus or anti-malware software (or whether such software is up to date), whether the client's software has been patched or updated sufficiently (e.g., whether one or more particular patches have been installed to an operating system of the client), whether the client is operating a firewall application (or whether the firewall application is up to date). The compliance level may also be determined based on a combination of the factors discussed above.

When the client is compliant, the method includes, at 310, determining whether the user may receive cleartext confidential information. In a particular embodiment, employees using computing assets associated with the private network may receive cleartext confidential information, while other users may receive encrypted information. When the client is not compliant or when the user may not receive cleartext confidential information, the method includes determining whether information associated with the data file is confidential at 312. When the information associated with the data file is not confidential or when the user may receive cleartext confidential information, the method includes, at 314, determining whether the user explicitly asked for protection. When the user does not explicitly ask for protection, the method includes, at 318, sending the data file to the client. For example, the data file may be sent unprotected. When the user explicitly asks for protection, or when the information associated with the data file is confidential, the method includes, at 316, protecting the data file. For example, persistent information protection may be applied to the data file. In a particular embodiment, the persistent information protection includes rights management, such as a policy that enforces user rights. The method also includes, at 318, sending the data file to the client. For example, the protected data file may be sent to the client. The method ends at 320.

Figure 4:
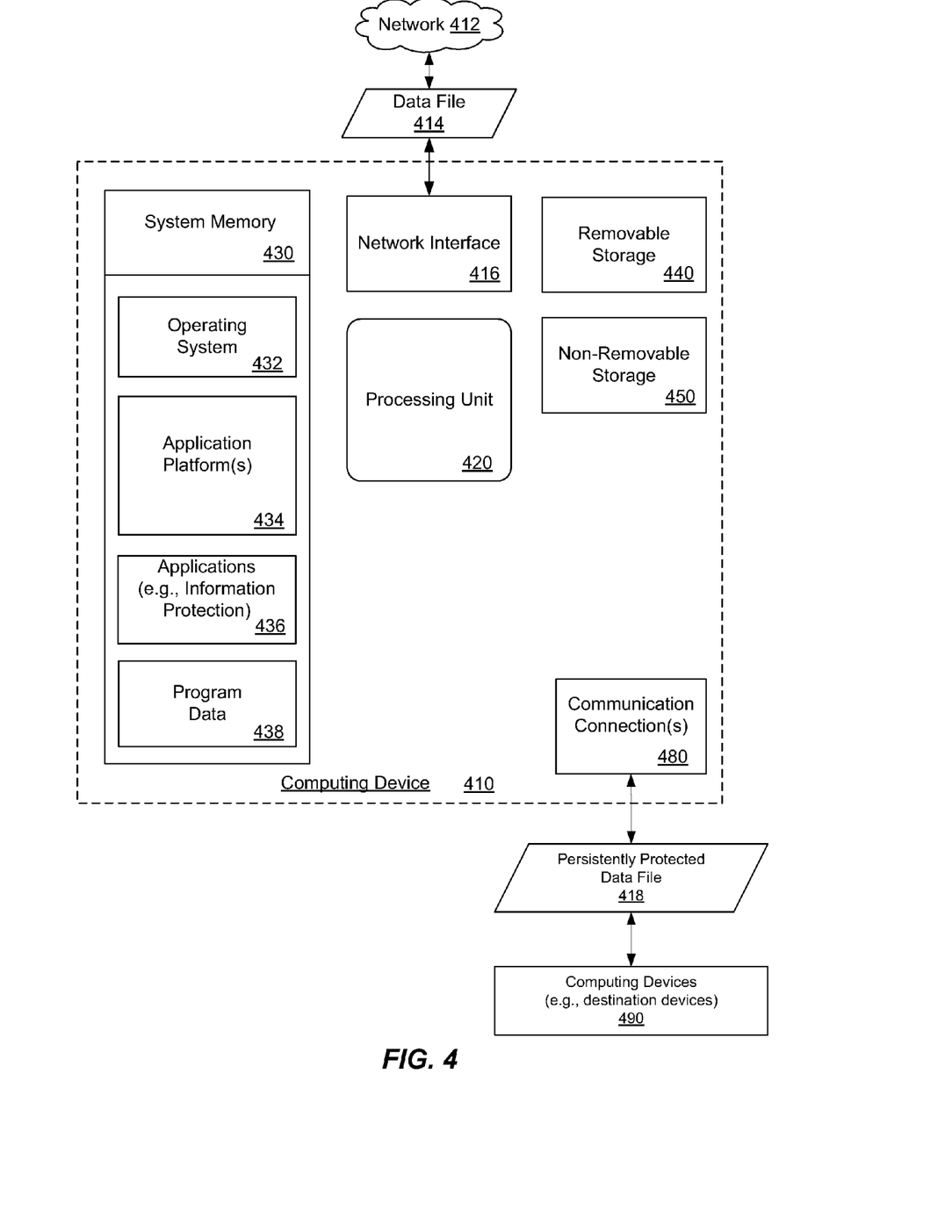
FIG. 4 is a block diagram depicting a general purpose computing system operable to enable computer-implemented methods and computer-readable media.

FIG. 4 shows a block diagram of a computing environment 400 including a general purpose computing device 410 operable to support embodiments of computer-implemented methods and computer program products according to the present disclosure. In a basic configuration, the computing device 410 includes a system configured to selectively apply information protection to data files that are to be sent external to a network, such as the system 100 described with reference to FIG. 1.

The computing device 410 typically includes at least one processing unit 420 and a system memory 430. Depending on the exact configuration and type of computing device, the system memory 430 may be volatile (such as random access memory or "RAM"), non-volatile (such as read-only memory or "ROM," flash memory, and similar memory devices that maintain the data they store even when power is not provided to them) or some combination of the two. The system memory 430 typically includes an operating system 432, one or more application platforms 434, one or more applications 436 (e.g., the information protection component 106 illustrated in FIG. 1), and may include program data 438.

The computing device 410 may also have additional features or functionality. For example, the computing device 410 may also include removable and/or non-removable additional data storage devices such as magnetic disks, optical disks, tape, and standard-sized or miniature flash memory cards. Such additional storage is illustrated in FIG. 4 by removable storage 440 and non-removable storage 450. Computer storage media may include volatile and/or non-volatile storage and removable and/or non-removable media implemented in any method or technology for storage of information such as computer-readable instructions, data structures, program components or other data. The system memory 430, the removable storage 440 and the non-removable storage 450 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing device 410. Any such computer storage media may be part of the computing device 410.

The computing device 410 also contains one or more communication connections 480 that allow the computing device 410 to communicate with other computing devices 490 (e.g., the destination device 122 discussed with reference to FIG. 1), such as one or more client computing systems or other servers, over a wired or a wireless network. The one or more communication connections 480 are an example of communication media. By way of example, and not limitation, communication media may include wired media such as a wired network or direct-wired connection, and wireless media such as acoustic, RF, infrared and other wireless media. In an illustrative embodiment, the computing device 410 can access a data file 414 via a network 412 (such as the internal network 112 discussed with reference to FIG. 1) using a network interface 416. The computing device 410 processes the data file 414 using the applications 436 to selectively apply persistent protection to the data file 414. The communication connections 480 may be used to send a persistently protected data file 418 to the other computing devices 490. It will be appreciated, however, that not all of the components or devices illustrated in FIG. 4 or otherwise described in the previous paragraphs are necessary to support embodiments as herein described.

The steps of a method or algorithm described in connection with the embodiments disclosed herein may be embodied directly in hardware, in a software component executed by a processor, or in a combination of the two. A software component may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an integrated component of a computing device or a user terminal. In the alternative, the processor and the storage medium may reside as discrete components in a computing device or user terminal.

Those of skill would further appreciate that the various illustrative logical blocks, configurations, modules, and algorithm steps described in connection with the embodiments disclosed herein may be implemented as electronic hardware, computer software, or combinations of both. To clearly illustrate this interchangeability of hardware and software, various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of selectively applying information protection, the method comprising:
   receiving a data file at a gateway coupled to a network, wherein the data file is to be sent to a destination device that is external to the network; and
   selectively applying information protection to the data file at the gateway prior to sending the data file to the destination device, wherein the information protection is selectively applied based on information associated with the destination device, information associated with the data file, and information provided by a user that caused the data file to be sent to the destination device,
   wherein the user that caused the data file to be sent to the destination device is a user of a device within the network.

2. The method of claim 1, wherein the information associated with the destination device includes compliance information, the information associated with the data file includes a confidentiality level, and the information provided by the user includes information provided directly by the user.

3. The method of claim 1, wherein the information associated with the destination device includes at least one of a trusted machine indicator and a compliant machine indicator.

4. The method of claim 3, wherein the compliant machine indicator represents compliance with corporate security policies, and wherein the corporate security policies include at least one of an anti-virus program, an anti-malware program, a system configuration, and a firewall.

5. The method of claim 3, wherein the trusted machine indicator is based on at least one of a machine certificate, a file key, a registry key, a running process, and a domain membership.

6. The method of claim 1, wherein the information protection is selectively applied to the data file based on a confidentiality level of the data file, and wherein the confidentiality level is determined based on at least one of a keyword of the data file, a pattern of data of the data file, a location of the data file, and metadata associated with the data file, wherein the confidentiality level includes at least one of read only, do not forward, do not save, and do not print.

7. The method of claim 1, wherein the data file is sent to the destination device and includes a persistent set of access controls that travel with the data file.

8. The method of claim 1, wherein the rights management is selectively applied to the data file at the gateway using an information protection component and wherein the gateway has access to an information protection server via the network.

9. The method of claim 1, wherein the information management includes persistent rights management, and wherein the persistent rights management includes encryption and policy-based user rights.

10. The method of claim 1, wherein an information rights management (IRM) policy is selectively applied to the data file, and wherein the data file is encrypted and a policy is added to the data file to generate an encrypted data file.

11. The method of claim 10, wherein the encrypted data file is decrypted using a private cryptographic key associated with the user.

12. The method of claim 1, wherein the device within the network attempts to send the data file to the destination device.

13. The method of claim 1, wherein the information provided by the user includes a user identification, the user identification usable to access other information associated with the user.

14. The method of claim 1, wherein the information provided by the user indicates that the user desires the data file to be protected.

15. The method of claim 1, further comprising determining whether the user requested protection of the data file based on the information provided by the user.

16. A computer-readable storage device comprising instructions that, when executed by a computer, cause the computer to:
   selectively apply information protection to a data file received at a gateway coupled to a network, wherein the data file is to be sent to a destination device that is external to the network, wherein the information protection is selectively applied to the data file based on information associated with the destination device, information associated with the data file, and information provided by a user of the destination device; and
   send the data file as a protected file that includes a persistent set of access controls that travel with the data file to the destination device.

17. The computer-readable storage device of claim 16, wherein the network includes an internal network, and wherein the data file is sent to the destination device via an external network.

18. The computer-readable storage device of claim 16, wherein the network includes a private network, and wherein the data file is sent to the destination device via a public network.

19. A gateway, comprising:

a network interface to receive a data file via a network, wherein the data file is to be sent to a destination device that is external to the network; and a rights management component to selectively apply rights management to the data file at the gateway prior to sending the data file to the destination device, wherein the rights management is selectively applied to the data file based on information associated with the destination device, information associated with the data file, and information provided by a user of the destination device, wherein the data file is sent to the destination device as a protected file that includes a persistent set of access controls that travel with the data file.

20. The gateway of claim 19, wherein the network includes a corporate network, and wherein the destination device includes a publicly accessible computing device.

* * * * *